United States Patent [19]
Welzel et al.

[11] 4,396,264
[45] Aug. 2, 1983

[54] MONOCULAR REFLEX CAMERA

[75] Inventors: Herbert Welzel; Lothar Reschke, both of Dresden, German Democratic Rep.

[73] Assignee: Veb Pentacon Dresden Kamera und Kinowerke, Dresden, German Democratic Rep.

[21] Appl. No.: 338,808

[22] Filed: Jan. 11, 1982

[30] Foreign Application Priority Data

Jan. 28, 1981 [DD] German Democratic Rep. ... 227257

[51] Int. Cl.$^3$ .............................................. G03B 19/12
[52] U.S. Cl. .................................................... 354/152
[58] Field of Search ................................... 354/54–56, 354/152–158, 201

[56] References Cited

FOREIGN PATENT DOCUMENTS 146348  2/1981  German Democratic Rep. ..................... 354/152

*Primary Examiner*—John Gonzales
*Attorney, Agent, or Firm*—Dowell & Dowell

[57] ABSTRACT

A monocular reflex camera having a viewfinder mirror and carrier assembly movable between a viewing position of the camera and an exposure taking position comprises a pivoted crank arm of which the pivot shaft is articulated connected with the mirror carrier close to the centre of gravity. The carrier has a lateral stop lug arrange at a distance from the pivot shaft and protruding into the path of the movement of the crank arm. A spring urges the stop lug into abutment with the crank arm. Stops are provided for locating said mirror assembly in the exposure taking position, and also in the viewfinding position. During the viewing position of the mirror and over a substantial portion of its travel into the exposure taking position, the lug is maintained in engagement with said crank arm by said spring and on arrival at the picture taking position the lug disengages the crank arm against the action of the spring.

3 Claims, 3 Drawing Figures

MONOCULAR REFLEX CAMERA

BACKGROUND TO THE INVENTION

The invention relates to a drive device for the viewfinder mirror of a single-lens reflex camera, where the mirror carrier and viewfinder mirror assembly is mounted on a pivot shaft in the manner of a crankshaft.

Such drive devices possess the advantage that a relatively small pivoting space is necessary for the viewfinder mirror between picture-taking position and viewfinding position. In one known drive device the viewfinder mirror is mounted on the pivot shaft at its upper edge close to the apex of its pivoting angle and a spring seeks to draw the viewfinder mirror against an abutment flange extending parallel with the pivot shaft and connected rigidly with the pivot shaft, in order to avoid undesired rotation of the viewfinder mirror about the crank axis (GFR P.S. No. 2,626,150). This hinge-type connection of the viewfinder mirror with the crank spindle requires relatively stable formation of the abutment flange and a correspondingly powerful abutment spring, so that the total mirror mass to be accelerated is increased.

OBJECT OF THE INVENTION

An object of the invention is to provide a mirror drive of crankshaft type in which more favourable force and motion conditions are achievable whereby the drive device is more acceleration compatible.

SUMMARY OF THE INVENTION

According to the invention there is provided a monocular reflex camera having a viewfinder mirror and carrier assembly movable between a viewing position of the camera and an exposure taking position comprising a pivoted crank arm of which the pivot shaft is articulatedly connected with the mirror carrier close to the centre of gravity, a lateral stop lug on said carrier arranged at a distance from the pivot shaft and protruding into the path of movement of the crank arm, a spring which seeks to bring the stop lug into abutment with the crank arm, first stop means for locating said mirror assembly in the exposure taking position, and second stop means for locating said mirror assembly in the viewfinding position, wherein during the viewing position of the mirror and over a substantial portion of its travel into the exposure taking position, the lug is maintained in engagement with said crank arm by said spring and on arrival at the picture taking position the lug disengages the crank arm against the action of the spring.

In a preferred embodiment the pivot shaft is connected with the mirror carrier at a distance behind the axis of gravity. The pivot shaft is expediently made integral with the crank arms and the journals.

BRIEF DESCRIPTION OF THE DRAWINGS

The invention is explained by reference to an illustrated and described example of embodiment.

DESCRIPTION OF PREFERRED EMBODIMENT

Figure 1:
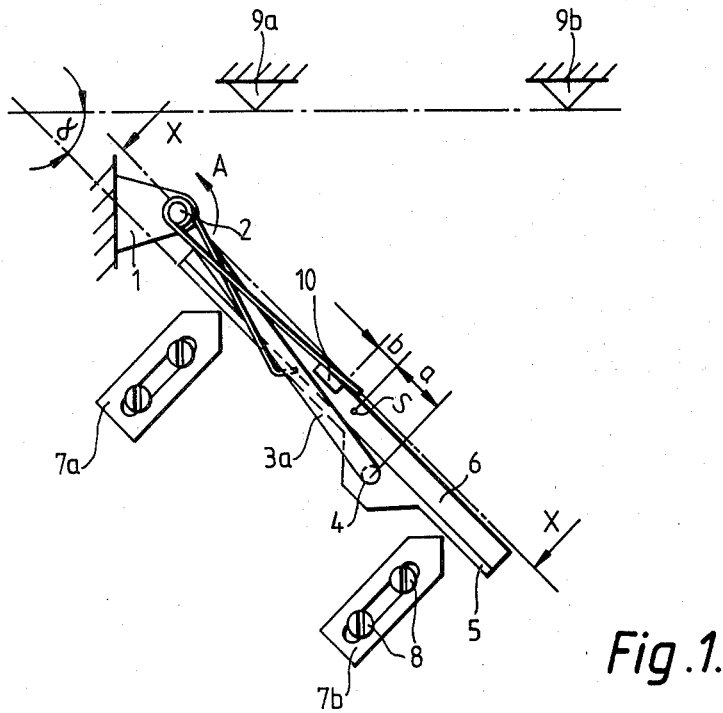
FIG. 1 shows the drive device in the viewfinding position.
Figure 2:
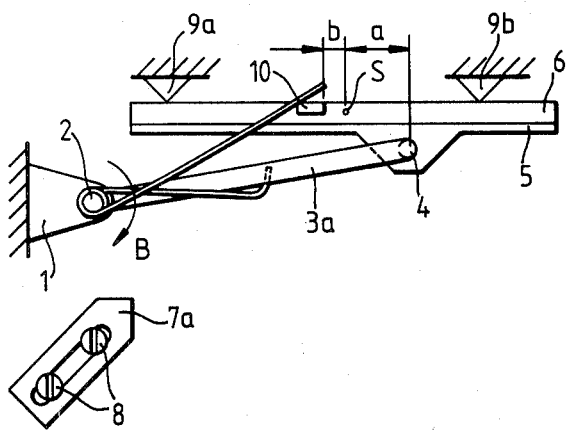
FIG. 2 shows the drive device in the picture taking position.
Figure 2:
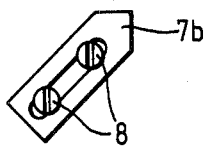
Figure 3:
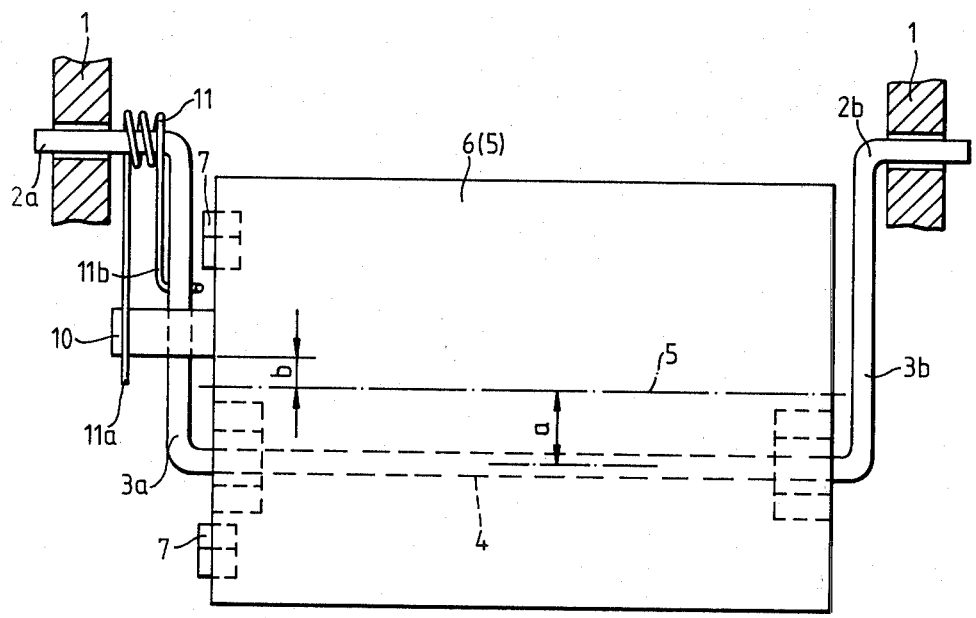
FIG. 3 shows an enlarged plan view along the line X—X.

The pivot shaft 4, which is made integral with the bent away crank arms 3a and 3b, and the journals 2, is mounted in crankshaft manner by means of the journals 2a and 2b in a camera housing 1 (FIG. 3). The mirror carrier 5 carrying the viewfinder mirror 6 is rotatably mounted on the pivot shaft 4 (FIGS. 1 and 2). The pivot shaft 4 is rotatably connected with the mirror carrier 5 at the distance a from the centre of gravity S. Between the journal 2 and the pivot shaft 4 the stop lug 10 is provided on the mirror carrier 5 and protrudes beyond the crank arm 3. The lug 10 is positioned at a distance b from the centre of gravity S. Around the journal 2a a loop spring 11 is wound which can be of relatively slight formation as a result of the relatively great distance between the journal 2 and the pivot shaft 4. The first arm 11a of the loop spring 11 presses against the stop lug 10 and the second arm 11b presses against crank arm 3a in order to keep the stop lug 10 in contact with the crank arm 3a. The mirror carrier 5 with the viewfinder mirror 6 is located in the viewfinding position by the viewfinding stops 7, which are adjustable by means of screws 8 (FIG. 1), the stop lug 10 being lifted away from the crank arm 3a against the loop spring 11. The viewfinder mirror 6 is located in the picture taking position (FIG. 2) by the picture taking stops 9, the stop lug 10 likewise being lifted away from the crank arm 3a against the loop spring 11.

The manner of operation of the arrangement is as follows:

On instigation of an exposure the crank arms 3 are driven in the counter-clockwise direction, in the direction of the arrow A (FIG. 1). In this action firstly the mirror carrier 5 tips about the viewfinding stop 7a, lifting away from the viewfinding stop 7b, until the stop lug 10 strikes upon the crank arm 3a as a result of the loop spring 11. During the further pivoting of the crank arms 3 the the stop lug 10 remains in contact with the crank arm 3a. Only when the mirror 6 reaches the picture-taking stop 9b is the stop lug 10 lifted away from the crank arm 3a, the mirror 6 sliding on the picture taking stop 9b. As soon as the mirror 6 also rests on the picture taking stop 9a the pivoting of the mirror carrier 5 with its mirror 6 is terminated and the exposure can commence. The return of the mirror carrier 5 with the mirror 6 takes place in the converse sequence and in the direction B.

As a result of the distance a of the pivot shaft 4 from the centre of gravity S the viewfinder mirror 6 with the mirror carrier 5 in any case endeavours, in the acceleration of the crank arms 3 out of the viewfinding position, to depart in succession from the viewfinding stops 7b and then 7a, so that the loop spring 11 is supported in pressing the stop lug 10 against the crank arm 3a.

During pivoting movement of the morror 6 from the viewfinding position into the exposure position (or vice versa) the lug 10 always remains in contact with the arm 3. Thereby a fluttering of the mirror 6 relative to the arm 3 is avoided. In the view finding position (FIG. 1) and in the exposure position (FIG. 2) the lug 10 is lifted from the arm 3 so that the mirror 6 is aligned on the stops 7 and 9 respectively.

We claim:

1. A monocular reflex camera having a viewfinder mirror and carrier assembly movable between a viewing position of the camera and an exposure taking position, comprising (a) a pivoted crank arm of which the pivot shaft is articulated connected with the mirror carrier close to the centre of gravity,
(b) a lateral stop lug on said carrier arranged at a distance from the pivot shaft and protruding into the path of the movement of the crank arm,
(c) a spring which seeks to bring the stop lug into abutment with the crank arm,
(d) first stop means for locating said mirror assembly in the exposure taking position, and
(e) second stop means for locating said mirror assembly in the viewfinding position, wherein during the viewing position of the mirror and over a substantial portion of its travel into the exposure taking position, the lug is maintained in engagement with said crank arm by said spring and on arrival at the picture taking position the lug disengages the crank arm against the action of the spring.

2. A camera according to claim 1, wherein the pivot shaft is connected with the mirror carrier at a distance from the centre of gravity remote from the mirror pivot axis.

3. A camera according to claim 1, wherein the pivot shaft is made integral with a pair of crank arms and journals.